US006795012B2

United States Patent
Nakanishi et al.

(10) Patent No.: US 6,795,012 B2
(45) Date of Patent: Sep. 21, 2004

(54) RADAR FOR DETECTING A TARGET BASED ON A FREQUENCY COMPONENT

(75) Inventors: Motoi Nakanishi, Kyoto-fu (JP); Toru Ishii, Kyoto-fu (JP); Tetsu Nishimura, Kyoto-fu (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 10/157,660

(22) Filed: May 29, 2002

(65) Prior Publication Data

US 2002/0180633 A1 Dec. 5, 2002

(30) Foreign Application Priority Data

May 30, 2001 (JP) ........................................ 2001-162479
Nov. 15, 2001 (JP) ........................................ 2001-350134

(51) Int. Cl.[7] .............................................. G01S 13/93
(52) U.S. Cl. .......................... 342/70; 342/109; 342/111; 342/115; 342/128; 342/192; 342/196
(58) Field of Search ............................... 342/70–72, 109, 342/111, 115, 128, 192, 195, 196

(56) References Cited

U.S. PATENT DOCUMENTS

| 5,268,692 | A | * | 12/1993 | Grosch et al. ................. 342/70 |
| 5,325,097 | A | * | 6/1994 | Zhang et al. .................. 342/71 |
| 5,625,362 | A | | 4/1997 | Richardson | |
| 5,751,240 | A | * | 5/1998 | Fujita et al. .................. 342/70 |
| 6,218,981 | B1 | * | 4/2001 | Uehara ......................... 342/70 |
| 6,222,481 | B1 | * | 4/2001 | Abrahamson et al. ........ 342/90 |
| 6,297,764 | B1 | * | 10/2001 | Wormington et al. ....... 342/101 |
| 6,445,339 | B1 | * | 9/2002 | Yamada ....................... 342/128 |

FOREIGN PATENT DOCUMENTS

| JP | 550383 | 7/1993 |
| JP | 10253750 | 9/1998 |
| JP | 10 253750 | 9/1998 |
| JP | 11 109026 | 4/1999 |
| JP | 11109026 | 4/1999 |
| JP | 11183600 | 7/1999 |
| WO | WO 98/19177 | 5/1998 |

OTHER PUBLICATIONS

European Search Report dated Sep. 18, 2002.

* cited by examiner

*Primary Examiner*—John B. Sotomayor
*Assistant Examiner*—Isam Alsomiri
(74) *Attorney, Agent, or Firm*—Dickstein, Shapiro, Morin & Oshinsky, LLP.

(57) ABSTRACT

In a radar, a coupler extracts a part of a transmission signal as a local signal and a mixer mixes a reception signal from a circulator and the local signal so as to output an intermediate frequency signal which is the frequency difference between the transmission signal and the reception signal. An IF-amplifying circuit amplifies the intermediate frequency signal and an AD converter converts the signal to digital data. A DC-removing unit removes a DC component by subtracting the average from the data and an FFT operation unit performs fast Fourier transform so that the distance to a target and the relative velocity of the target are calculated based on a peak included in the frequency spectrum.

5 Claims, 6 Drawing Sheets

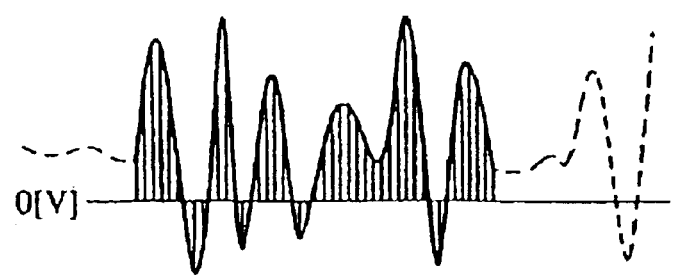
FIG. 3A
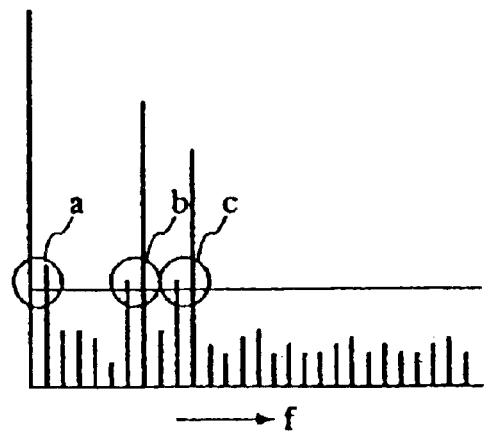
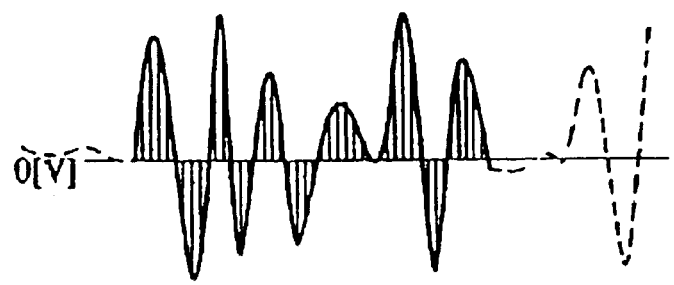
FIG. 3B
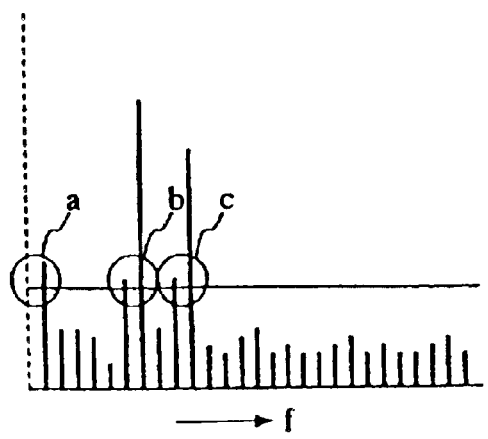

RADAR FOR DETECTING A TARGET BASED ON A FREQUENCY COMPONENT

BACKGROUND OF THE INVENTION

1. Field of the Invention

The present invention relates to a radar for detecting vehicles, people, and so on by using, for example, radio waves in the millimeter-wave band.

2. Description of the Related Art

Hitherto, a continuous-wave radar is known as a radar for mounting on vehicles such as automobiles. This continuous-wave radar frequency-modulates a transmission signal, transmits the signal, and receives a reflection signal from a target after transmission, so as to measure the distance to the target and the relative velocity of the target by using a beat signal between the transmission signal and the reception signal. In this radar using a modulated continuous-wave, the following problems occur.

That is, the frequency of the beat signal, which is a frequency difference signal between the transmission signal and the reception signal, decreases as the distance between the radar and the target decreases. When the frequency of the beat signal decreases to two periods or less in an observation range, the resolving power of the radar becomes less than the resolving power of a fast Fourier transform (FFT). As a result, the peak frequency cannot be detected accurately and thus the distance is difficult to measure. Also, since the frequency component of the beat signal caused by the reflection signal from such a close range appears in a region of large noise, in the vicinity of the DC component, the detecting performance for a close range deteriorates due to the relationship with a noise index of a reception system. For these reasons, the detection coverage becomes narrow.

In (1) Japanese Unexamined Utility Model Registration Application Publication No. 5-50383 and (2) Japanese Unexamined Patent Application Publication No. 11-109026, attempts to overcome the above-described problems are disclosed.

In the radar disclosed in (1), a beat signal corresponding to a close range less than the FFT resolving power is effectively used. That is, it is determined that a target exists within a close range when the spectrum level of the DC component and the frequency components adjacent thereto among the frequency components obtained by the frequency analysis of a beat signal increases so as to exceed a predetermined value in the case where a target does not exist.

In the radar disclosed in (2), the frequency of any one of a reception signal and a local oscillation signal for generating a beat signal to be input to a mixer is offset by an intermediate frequency.

Also, in (3) Japanese Unexamined Patent Application Publication No. 10-253750, detection errors and calculation errors of a relative velocity and a relative distance are prevented by removing the effect of offset voltages of a transmitter-receiver and an AD converter, from a point of view other than improving the close range detection performance.

However, the DC component appears in the output of a mixer even when a target does not exist in a close range. Also, the DC component appears when extracting samples for FFT operation asynchronously with respect to a signal period. Therefore, in the radar according to (1), no significant variation in the spectrum level of the DC component and the nearby frequency components of a beat signal appears in the case where a target exists in a close range and in the opposite case. As a result, it is difficult to set a threshold for determining the existence of a target.

In the radar according to (2), a circuit for offsetting the frequency of a beat signal by the intermediate frequency is required. Also, frequency analysis must be performed over a large frequency range because of the offset. Thus, a sampling frequency must be increased and a high-rate processing ability is required accordingly.

In the radar according to (3), the average of a beat signal between a transmission signal and a reception signal is obtained as an offset component by stopping transmission so as to calculate an offset voltage generated in the circuit of the transmitter-receiver and an offset voltage generated in the circuit of the AD converter. The offset component is compensated steadily to an AD conversion value.

However, even when the offset voltage generated in the circuit of the transmitter-receiver and the offset voltage generated in the circuit of the AD converter are steadily compensated, by dividing sampling data to be frequency-analyzed by FFT into necessary sampling intervals asynchronously with respect to the period of the beat signal, a DC component appears in the FFT result due to so-called truncation. Also, the DC component appears for the same reason when the beat signal is less than one range bin (frequency resolving power) of the FFT, that is, when the beat signal is less than one period in the sampling interval for the FFT, due to the reflection of a signal in the circuit included in the radar.

Consequently, the DC component cannot be removed from the FFT result simply by compensating the offset voltage generated in the circuit of the transmitter-receiver and the offset voltage generated in the circuit of the AD converter.

These problems occur when velocity measurement in a low-velocity region is performed in radars for detecting a Doppler shift frequency, such as a pulse Doppler radar and a frequency shift keying (FSK) radar, as well as a radar using a modulated continuous-wave, such as a frequency modulated continuous wave (FMCW) radar.

SUMMARY OF THE INVENTION

Accordingly, it is an object of the present invention to provide a radar by which target detection can be performed easily without having a complex overall configuration, when close range detection is performed by a modulated continuous-wave radar such as an FMCW radar and low-velocity range detection is performed by a radar for detecting a Doppler shift frequency, such as a pulse Doppler radar or an FSK radar.

In order to achieve the above-described object, a radar according to the present invention comprises a unit for transmitting a transmission signal as a detecting radio wave and receiving a reception signal including a reflection signal from a target which reflects the transmission signal as the reception signal; a sampling-data-sequence generating unit for sampling a beat signal which is a signal of the frequency difference between the transmission signal and the reception signal and AD-converting the beat signal so as to obtain a sampling data-sequence having a predetermined number of data items; an analyzed data generating unit for generating data to be frequency-analyzed by subtracting the average of the data in a predetermined sampling interval to be frequency-analyzed of the sampling data-sequence from each of the data items in the sampling interval; and a unit for frequency-analyzing the data to be frequency-analyzed by a discrete Fourier transform to obtain the frequency component of the beat signal and for detecting the target based on the frequency component.

With this arrangement, the DC component does not appear in a result of discrete frequency analysis by, for example, fast Fourier transform (FFT), and thus the existence of a peak in a low-frequency region in the vicinity of the DC component can be reliably detected. As a result, a target can be easily detected without a complex overall configuration, even when target detection in a close range is performed by using a modulated continuous-wave radar such as an FMCW radar or when detection in a low-velocity region is performed used by a radar for detecting a Doppler shift frequency, such as a pulse Doppler radar or an FSK radar.

Preferably, the analyzed data generating unit generates the data to be frequency-analyzed by subtracting the average of the data in the sampling data-sequence from each of the data items in the sampling data-sequence and by providing window function processing. That is, the DC component is removed before window function processing. Accordingly, the spectrum in the vicinity of the DC component does not become wide after window function processing, and thus the existence of a peak in a low-frequency region in the vicinity of the DC component can be reliably detected.

Further, in the present invention, the detecting radio wave is a frequency-modulated wave including an up-modulation interval in which the frequency gradually increases and a down-modulation interval in which the frequency gradually decreases, the up-modulation interval and the down-modulation interval being repeated over time so as to form a triangular waveform. The relative distance and the relative velocity of the target are detected based on the beat signal in the up-modulation interval and the beat signal in the down-modulation interval.

With this arrangement, the distance to a target in a close range and the relative velocity can be detected by a so-called FMCW method.

Other features and advantages of the present invention will become apparent from the following description of embodiments of the invention which refers to the accompanying drawings.

BRIEF DESCRIPTION OF THE DRAWINGS

FIGS. 3A and 3B show an intermediate frequency signal and its frequency spectrum;

DESCRIPTION OF EMBODIMENTS OF THE INVENTION

Hereinafter, the configuration of a radar according to a first embodiment will be described with reference to FIGS. 1 to 5.

Figure 1:
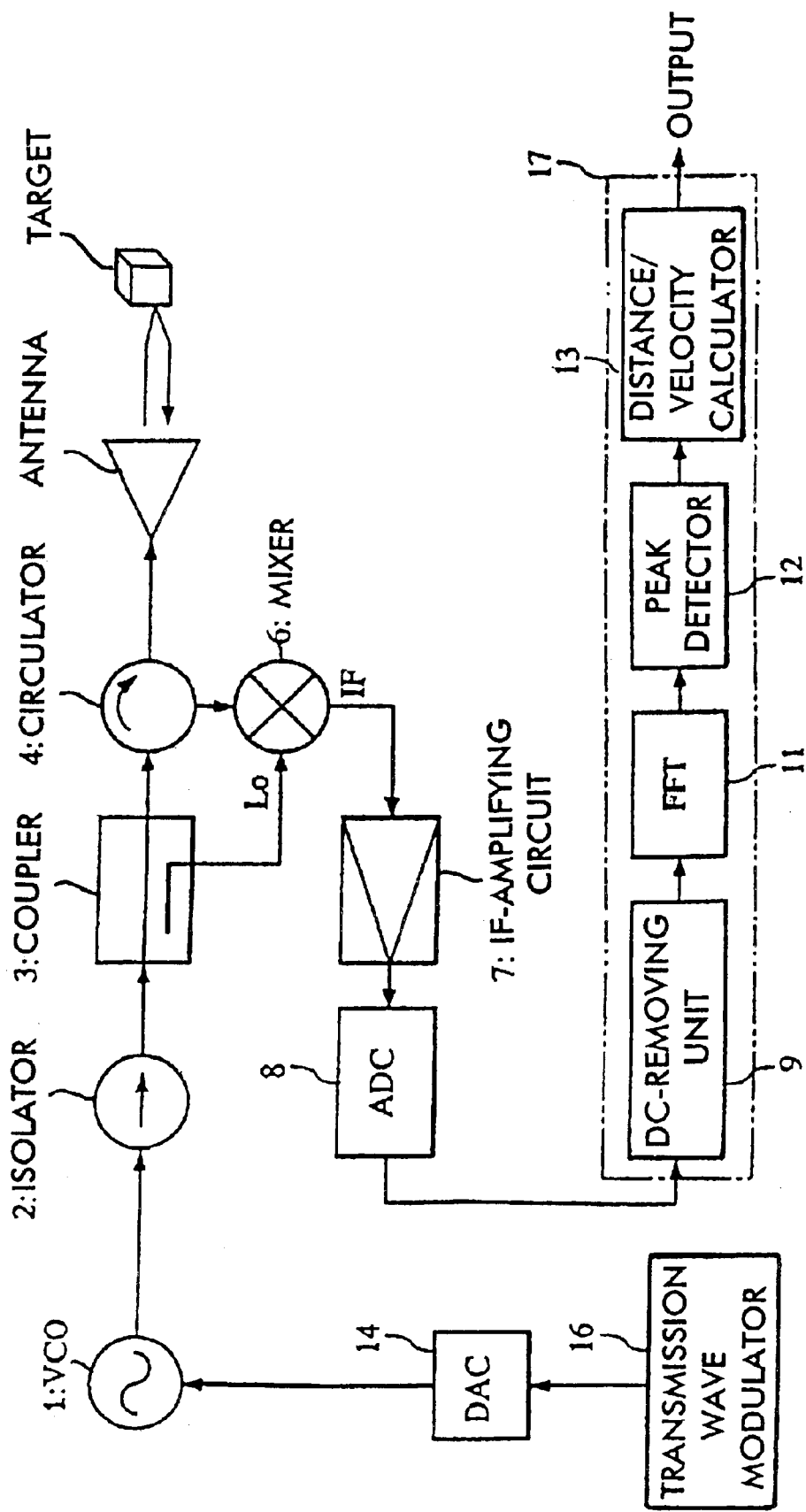
FIG. 1 is a block diagram showing the configuration of a radar according to a first embodiment.

FIG. 1 is a block diagram showing the overall configuration of the radar. Herein, a voltage-controlled oscillator (VCO) 1 changes the oscillation frequency in accordance with a control voltage output from a DA converter 14. An isolator 2 transmits an oscillation signal from the VCO 1 to a coupler 3 so as to prevent a reflection signal from entering the VCO 1. The coupler 3 transmits the signal from the isolator 2 to a circulator 4 and applies a part of a transmission signal as a local signal Lo to a mixer 6 with a predetermined distribution ratio. The circulator 4 transmits the transmission signal to an antenna 5 and applies a reception signal from the antenna 5 to the mixer 6. The antenna 5 transmits the frequency-modulated continuous-wave transmission signal of the VCO 1 and receives a reflection signal from the same direction. Also, the antenna 5 periodically changes the direction of the transmission signal as a beam within detection angles.

The mixer 6 mixes the local signal Lo from the coupler 3 and the reception signal from the circulator 4 so as to output an intermediate frequency signal IF. An IF-amplifying circuit 7 amplifies the intermediate frequency signal by a predetermined amplification factor in accordance with distance. An AD converter 8 converts the voltage signal to a sampling data-sequence. Among the sampling data-sequence obtained in the AD converter 8, a DC-removing unit 9 calculates the average of the data in a predetermined sampling interval which is to be processed in a fast Fourier transform (FFT) operation unit 11 at the next stage. Since the average is equal to a DC component obtained by the FFT, the DC component is removed before the FFT operation by subtracting the average from each data item in every sampling interval.

Herein, by representing the data of each sampling interval by f(i) and the number of data items of each sampling interval by n, data f(t) at time t in the sampling interval after removal of the DC component can be represented as follows.

$$f(t)=f(i)-\Sigma f(i)/n \; (i=1, 2, 3, \ldots, n)$$

Herein, a sum operator $\Sigma$ functions for i=1 to n.

The FFT operation unit 11 analyzes a frequency component included in the data in the sampling interval whose DC component has been removed. A peak detector 12 detects maximum positions of the frequency component having a level which exceeds a predetermined threshold.

A transmission wave modulator 16 sequentially outputs digital data of a modulation signal to the DA converter 14. Accordingly, the oscillation frequency of the VCO 1 is frequency-modulated so that a continuous triangular wave is generated. Also, a distance/velocity calculator 13 calculates the distance between the antenna and a target and the relative velocity based on the frequency of a beat signal in an up-modulation interval where the frequency of the transmission signal gradually increases (hereinafter referred to as an upbeat signal) and the frequency of the beat signal in a down-modulation interval where the frequency of the transmission signal gradually decreases (hereinafter referred to as a downbeat signal), and outputs the calculation result to the host device, as will be described later.

Further, the DC-removing unit 9, the FFT operation unit 11, the peak detector 12, and the distance/velocity calculator 13 are integrated in an operation element 17 such as a digital signal processor (DSP). That is, the operation in these components is performed by the DSP. Of course, the signal processing may be performed by using a dedicated integrated circuit instead of being performed at the DSP.

Figure 2:
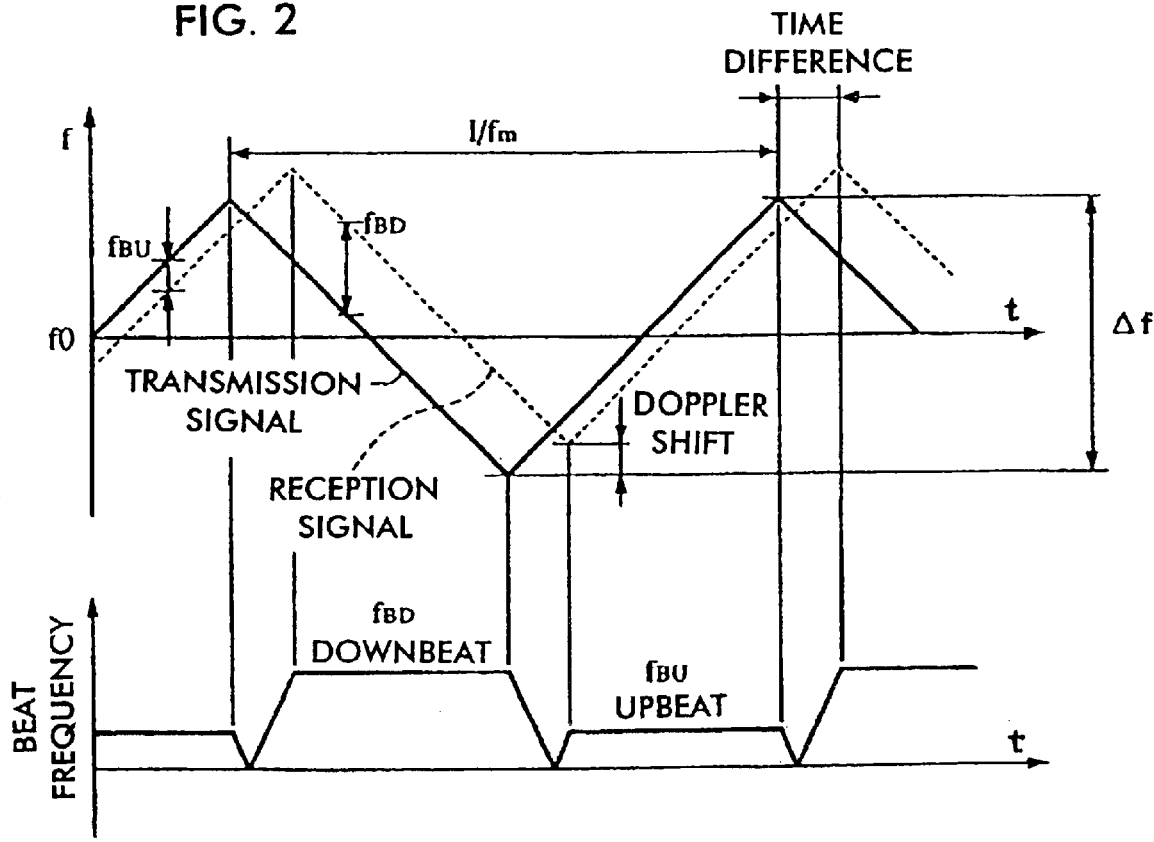
FIG. 2 shows an example of frequency variations of a transmission signal and a reception signal caused by a distance between the radar and a target and the relative velocity of the target with respect to the radar.

FIG. 2 shows an example of the deviation of the variation in the frequency of the transmission signal and that of the reception signal, the deviation being caused by the distance to the target and the relative velocity. The frequency difference between the transmission signal and the reception signal while the frequency of the transmission signal is increasing is an upbeat frequency $F_{BU}$ and the frequency difference between the transmission signal and the reception signal while the frequency of the transmission signal is decreasing is a downbeat frequency $f_{BD}$. The deviation of the triangular waves of the transmission signal and the reception signal in the time axis (time difference) corresponds to the round-trip time of the radio wave between the antenna and the target. Also, the deviation of the transmission signal and the reception signal in the frequency domain is the amount of Doppler shift, which is caused by the relative velocity of the target with respect to the antenna. The values of the upbeat $F_{BU}$ and the downbeat $F_{BD}$ vary according to the time difference and the amount of Doppler shift. On the other hand, the distance between the radar and the target and the relative velocity of the target with respect to the radar are calculated by detecting the upbeat and downbeat frequencies.

Figure 4:
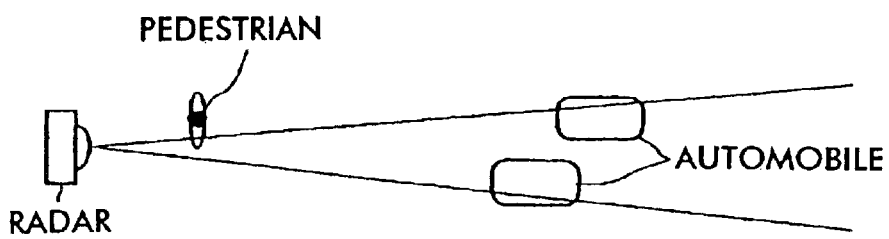
FIG. 4 shows an example of positions of a radar and targets.

FIG. 4 shows an example of positions of the radar and targets. Herein, a pedestrian exists within a close range and two automobiles exist a little away from the pedestrian.

FIGS. 3A and 3B show the effect of removal of the DC component. In each of FIGS. 3A and 3B, the upper diagram shows a time waveform and the lower diagram shows the frequency spectrum. FIG. 3A shows a state before removal of the DC component and FIG. 3B shows a state after removal of the DC component. In this example, the level of the frequency spectrum exceeds the threshold at the parts indicated by a, b, and c in both FIGS. 3A and 3B. The a-part corresponds to the pedestrian in FIG. 4 and the b-part and c-part correspond to the two automobiles in FIG. 4. However, it is difficult to determine whether the DC component or the frequency component in the vicinity thereof indicated by a is caused by a target which exists within a close range or is a component imposed due to the circuit configuration or signal processing. Therefore, peak detection is not performed in a region of frequencies lower than a predetermined frequency in the known art, because peak detection cannot be performed accurately in the vicinity of the DC component.

On the other hand, as shown in FIG. 3B, the DC component of the frequency spectrum (a broken line) does not appear when the result of DC component removal undergoes FFT processing. Accordingly, the peak detection at the part indicated by a can be easily performed and thus the existence of a target within a close range can be detected.

Figure 5:
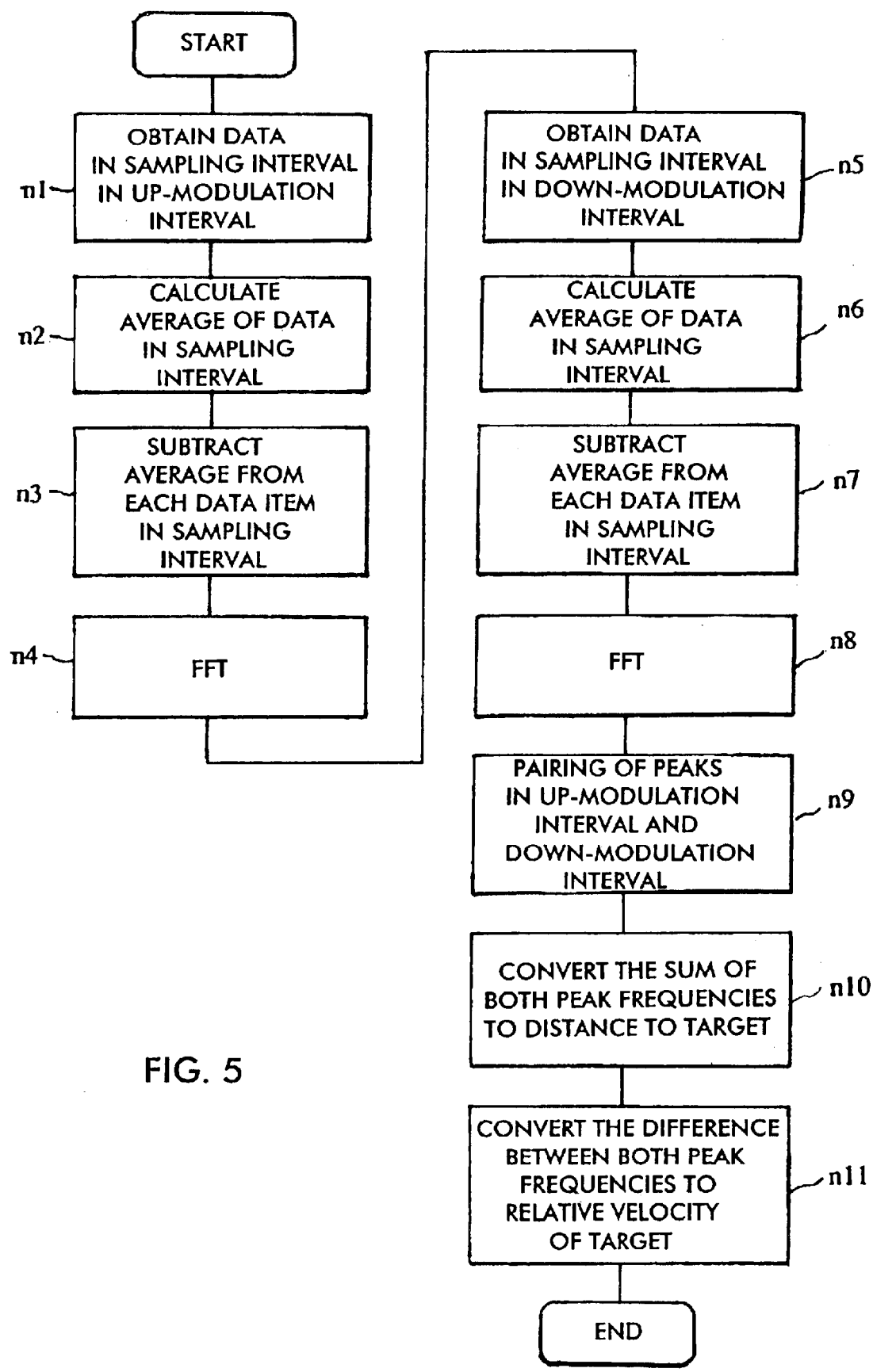
FIG. 5 is a flowchart showing the process for detecting a distance and a relative velocity.

FIG. 5 is a flowchart showing a process for measuring the distance and velocity using the operation element 17, such as a DSP, shown in FIG. 1.

First, data in a predetermined sampling interval in the up-modulation interval are obtained (n1). Next, the average of the obtained data is calculated and the average is subtracted from each of the data items in the sampling interval (n2 to n3). Then, each of the data items in the sampling interval after the subtraction undergoes fast Fourier transform (FFT) processing so as to obtain the frequency component of the upbeat signal (n4).

Subsequently, data in a predetermined sampling interval in the down-modulation interval are obtained (n5). Next, the average of the obtained data is calculated and the average is subtracted from each of the data items in the sampling interval (n6 to n7). Then, each of the data items in the sampling interval after the subtraction undergoes fast Fourier transform (FFT) processing so as to obtain the frequency component of the downbeat signal (n8).

Then, the frequency at the position where the level is high in the frequency component of the upbeat signal (hereinafter referred to as a peak frequency) and the peak frequency in the frequency component of the downbeat signal are detected so as to perform pairing (n9). That is, a combination of peak frequencies caused by the same target is determined with respect to the peak frequency appearing in the frequency component of the upbeat signal and the peak frequency appearing in the frequency component of the downbeat signal.

After that, the distance from the radar to the target is calculated based on the sum of the peak frequency of the upbeat signal and the peak frequency of the downbeat signal which are paired with each other (n10). Also, the relative velocity of the target with respect to the radar is calculated based on the difference between the peak frequency of the upbeat signal and the peak frequency of the downbeat signal (n11).

Figure 6:
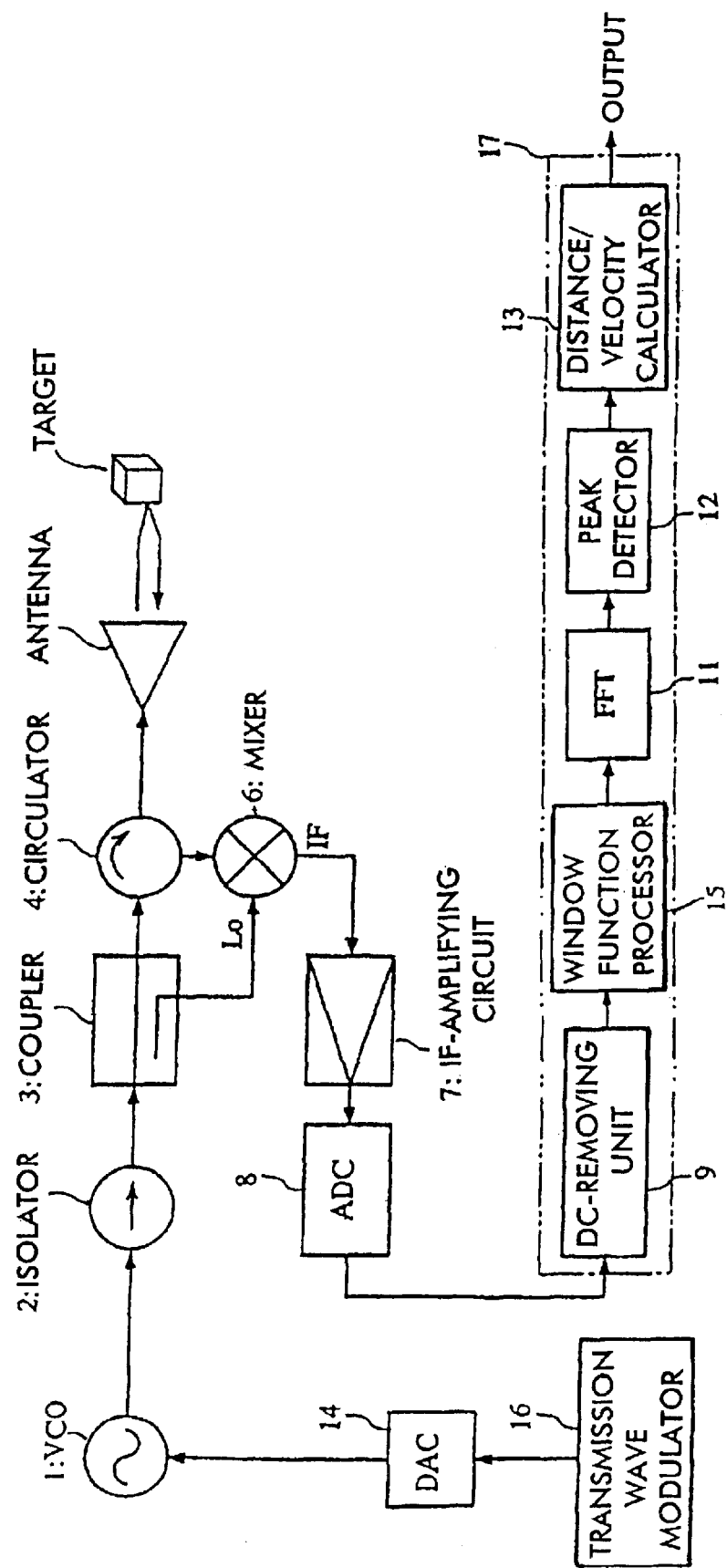
FIG. 6 is a block diagram showing the configuration of a radar according to a second embodiment.

FIG. 6 is a block diagram showing the configuration of a radar according to a second embodiment. In FIG. 6, a window function processor 15 extracts data using a window function in a predetermined form for the data after removal of the DC component by the DC-removing unit 9. As a result of extraction using the window function, truncation errors, which are caused when a limited sampling interval is extracted from a time waveform so as to perform an FFT operation, can be prevented. For example, window function processing such as Hanning window, Hamming window, or Blackman-Harris window is performed. The remaining configuration is the same as that shown in FIG. 1.

By performing window function processing, the main lobe, the side lobe, and the attenuation vary in accordance with the window function form. However, by performing window function processing on the result obtained by removing the DC component, a high frequency resolving power can be maintained without being affected by the DC component.

Figure 7A:
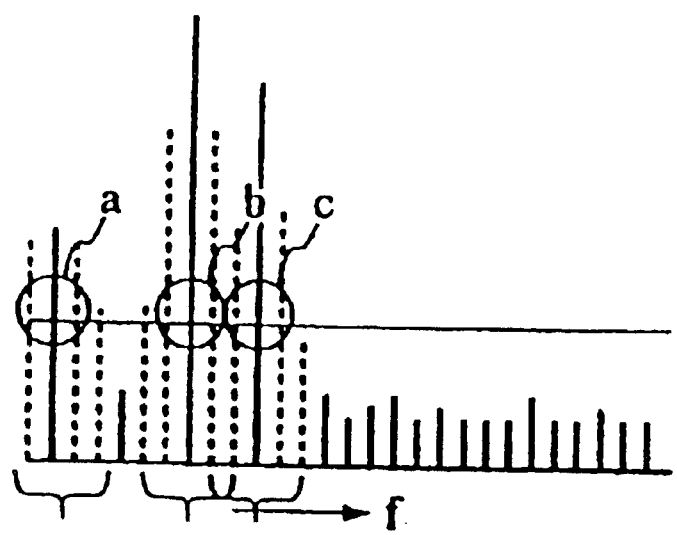
FIGS. 7A and 7B show examples of frequency spectrum in the radar.
Figure 7B:
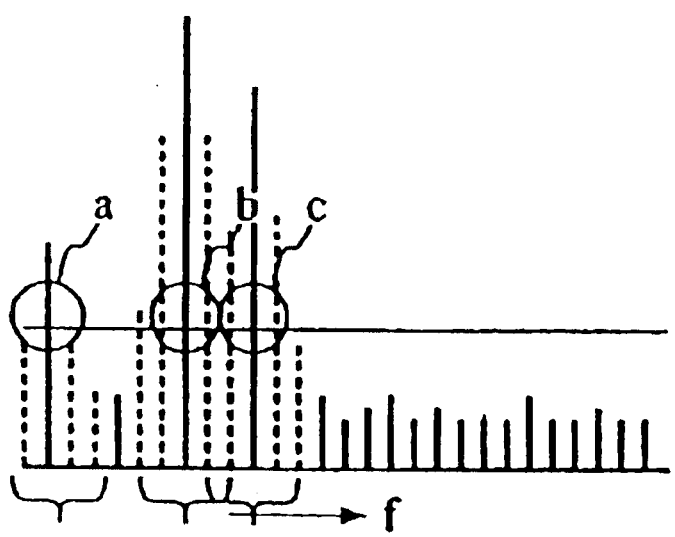

FIGS. 7A and 7B show a variation in a spectrum in the case where the DC component is removed after window function processing and the case where the DC component is removed before window function processing.

By removing the DC component after window function processing, that is, by performing window function processing without removing the DC component, the spectrum in the vicinity of the DC component becomes wide, as shown in FIG. 7A, and thus detection of the peak position and determination of the existence of a target are difficult. On the other hand, by removing the DC component before window function processing, the spectrum in the vicinity of the DC component does not become wide, as shown in FIG. 7B, and thus detection of the peak position in the vicinity of the DC component and determination of the existence of a target can be easily performed.

As described above, by extracting a periodical waveform over a limited time width, the spectrum becomes wide due to the truncation. Accordingly, the frequency position where the intensity has a maximum value is regarded as a peak frequency in the range above the threshold.

A frequency modulated continuous wave (FMCW) radar is described in the above-described embodiments. However, the present invention can be applied to any part performing frequency-analysis of a beat signal in a radar for detecting a Doppler shift frequency, such as a pulse Doppler radar or a frequency shift keying (FSK) radar.

Further, although frequency-analysis is performed by fast Fourier transform (FFT) in the above-described embodiments, the method of analyzing the frequency is not limited to FFT. Discrete Fourier transform, in which a DC component appears in the result of frequency-analysis by so-called truncation when the sampling data to be frequency-analyzed is divided into necessary sampling intervals, can also be applied.

Although the present invention has been described in relation to particular embodiments thereof, many other variations and modifications and other uses will become apparent to those skilled in the art. Therefore, the present invention is not limited by the specific disclosure herein.

What is claimed:

1. A method of detecting a target, the method comprising:

transmitting a transmission signal as a detecting radio wave and receiving a reception signal including a reflection signal from the target which reflects the transmission signal as the reception signal;

generating a sampling-data-sequence by sampling a beat signal comprising a signal related to the frequency difference between the transmission signal and the reception signal and AD-converting the beat signal so as to obtain a sampling data-sequence having a predetermined number of data items;

generating data to be frequency-analyzed by subtracting an average of data in a predetermined sampling interval of the sampling data-sequence from each of the data items in the sampling interval; and frequency analyzing the data to be frequency-analyzed by a Fourier transform to obtain a frequency component of the beat signal, and detecting at least one of a relative distance and a relative velocity of the target based on the frequency component.

2. The method of claim 1, wherein the step of generating data comprises generating the data to be frequency-analyzed by subtracting the average of the data in the sampling interval from each of the data items in the sampling interval and by providing window function processing.

3. The method of claim 2, wherein the detecting radio wave is a frequency-modulated wave including an up-modulation interval in which the frequency increases and a down-modulation interval in which the frequency decreases, the up-modulation interval and the down-modulation interval being repeated over item so as to form a triangular waveform of frequency versus time, and wherein a relative distance and a relative velocity between the radar and the target are detected based on the beat signal in the up-modulation interval and the beat signal in the down-modulation interval.

4. The method of claim 1, wherein the detecting radio wave is a frequency-modulated wave including an up-modulation interval in which the frequency increases and a down-modulation interval in which the frequency decreases, the up-modulation interval and the down-modulation interval being repeated over time so as to form a triangular waveform of frequency versus time, and wherein a relative distance and a relative velocity between the radar and the target are detected based on the beat signal in the up-modulation interval and the beat signal in the down-modulation interval.

5. The method of claim 1, wherein a DC component of the beat signal is removed by subtracting the average of the data in the predetermined sampling interval of the sampling sequence from each of the data items in the sampling interval.

* * * * *